1,945,293

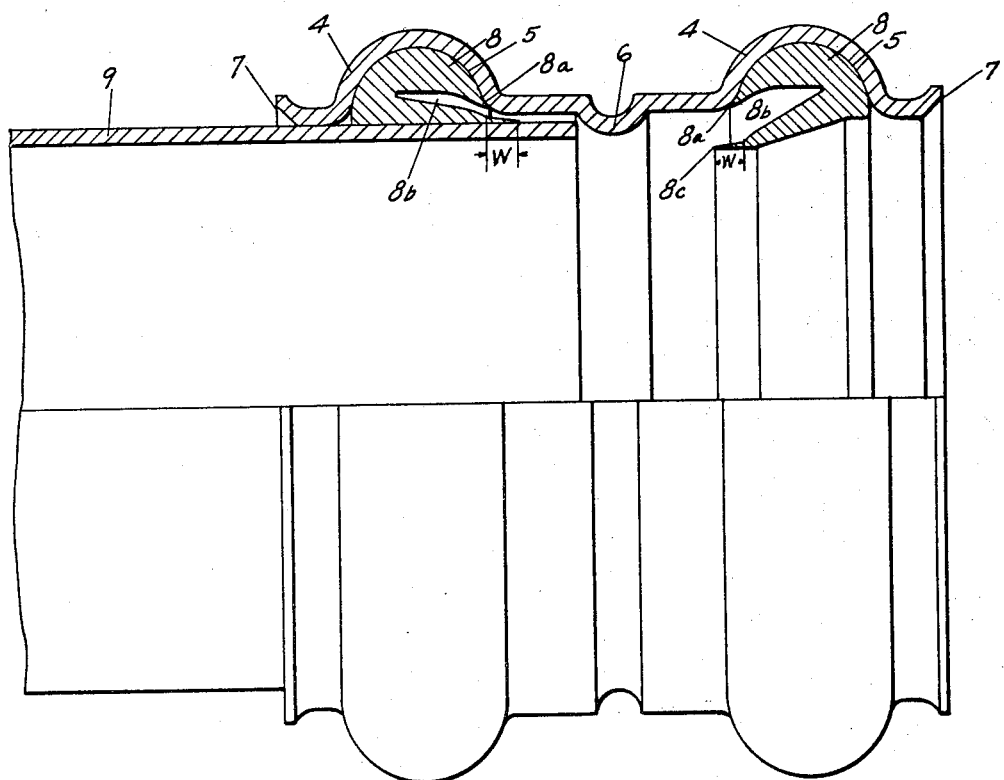
Fig. I
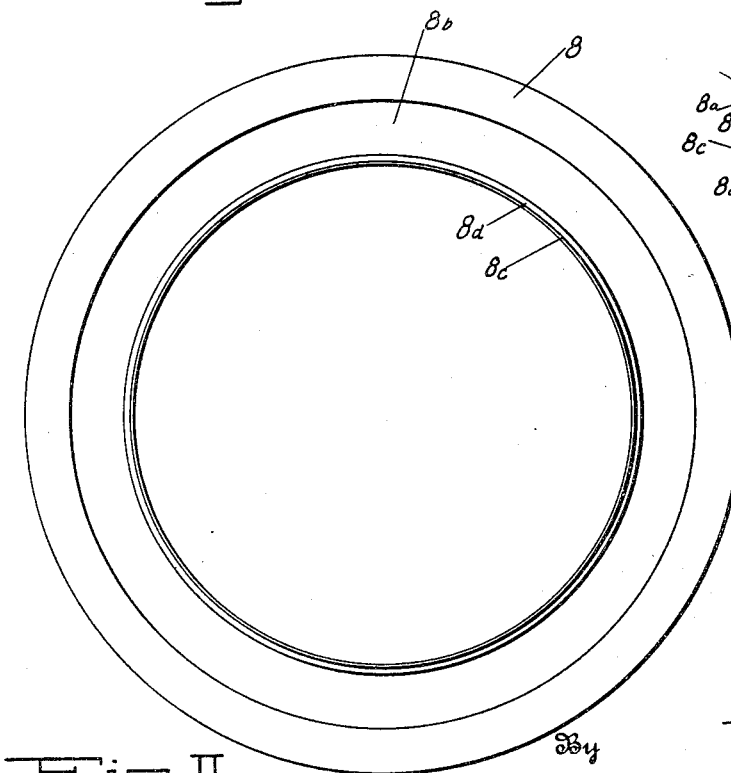
Fig. II
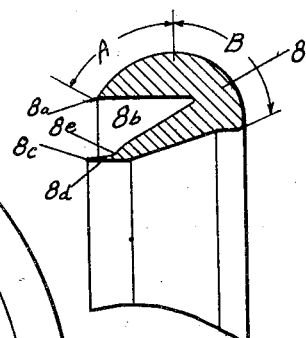
Fig. III
Inventor
RALPH H. PIERCE
By G. F. McDougall
Attorney Patented Jan. 30, 1934

UNITED STATES PATENT OFFICE 1,945,293

PIPE JOINT

Ralph H. Pierce, Eugene, Oreg.

Application October 13, 1931. Serial No. 568,582

1 Claim. (Cl. 285—193)

My invention relates to appliances for joining the ends of unthreaded pipe. They are commonly used as field joints, have some value as expansion joints to take care of the movement due to temperature changes, and are especially useful in connection with the laying of lines of welded steel pipe.

Welded steel pipe is commonly made of metal too thin to allow threading and coupling with threaded couplings. The only other alternative is then a welded field joint, difficult and expensive to execute in a trench, or a coupling having a packing so that it can be applied to the pipe and will result in a fluid tight joint.

The problem here involved is many years old and many attempts have been made to solve it; a very successful coupling so far as tightness is concerned is made on the stuffing box principle having bolts to tighten a rubber ring and compress it around the pipe. It is, however, expensive to build and difficult to properly tighten in a trench.

Before my new invention, so far as I am aware and as I believe, all joints heretofore made by cup-rubbers, to coin a word, that is to say rubbers that depended upon the internal pressure of the contained fluid to make them hug the pipe, have been commercial failures for the reason that if the cup-rubber was made enough smaller than the pipe it was to encircle so that the original grip of the rubber on the pipe would result in a tight joint then it was practically impossible of assembly in the field, and conversely if made so that the pipe could readily be inserted within it in the field, then it would invariably leak until the pressure reached a very considerable amount and began to have its effect toward making the rubber grip the pipe.

These pipe jobs are installed under the supervision of inspectors, and an inspector seeing a wet joint and particularly one throwing a small stream of water will condemn the joint and demand its replacement. Again if any considerable number of joints are used in a pipe line the aggregate leakage will often amount to enough to prevent raising the pressure in the pipe line to a point where the pressure on the internal side of the cup-rubber begins to take effect.

In order to meet the conditions the cup-rubber must be capable of sealing over ordinary unfinished pipe at any pressure from zero up to the test pressure required on the pipe line and higher. As before stated there is no difficulty with high pressure, the low pressure having heretofore been the point presenting the insurmountable difficulty.

To meet the conditions heretofore enumerated and produce a joint that is well designed as to strength, economical of material, easy to install in the field and permanently tight under all pressures is the purpose of this my present invention.

I accomplish the objects of this invention by the structure illustrated in the accompanying drawing in which a pipe joint made to accommodate the adjacent ends of two pipes but having only one inserted, is shown partly sectioned, in Fig. I.

Fig. II is an end view of Fig. I looking in the direction of the arrow in Fig. I;

Fig. III is a small section of my new type cup-rubber.

A pipe sleeve, 4, having cup-rubber pockets, 5, an internal rib, 6, and external end bells, 7, may be conveniently made by cold rolling a piece of tubing of the type used for making deep draw articles. It may also be cold rolled from a good grade of soft iron and should have a thickness proportioned to the internal pressure that it is expected to carry. On account of the finished shape as shown it will have a much greater rigidity than a piece of plain tubing of equal length and shell thickness. The cup-rubber pocket, 5, will have an internal surface that is an arc of a circle, preferably somewhat less than a half circle. The cup-rubber, 8, is shown in Fig. I to hug the inside of this circular arc closely but it is not molded on that part of its surface to a uniform circular outline. That part of it, shown in Fig. III and designated by the arc, A, is made to a longer radius than that part of it designated by B, the arc B being made to the same radius as the inside of the cup-rubber pocket, 5, will lay in the pocket very smoothly, while that part represented by the arc A requires some compression and therefore the lip, 8a, is bent down as shown in Fig. I and tends to make a preliminarily tight joint at this point while pushing the arc A firmly to its seat.

It has been found expedient to make a cup-rubber in this manner and about of the proportions illustrated in order that the pipe indicated by numeral 9 may be readily inserted and at the same time tighten the cup-rubber into its seat.

The cup-rubber, 8, has a cup, 8b, and as molded the cup will be roughly a triangle though the shape may be varied somewhat without particular disadvantage.

Now comes the outstanding point of my new invention, that which makes it a success when all other similar appearing appliances have proved failures; and this is the feather-edge lip, 8c. This, as the name I have given it indicates, has a feather edge at 8d and may be even thinner, in proportion, at its juncture with 8, shown at 8e, than the scale of the drawing would indicate. It will be well even on the largest cup-rubbers to make it a sixteenth of an inch or less at the point indicated as 8e and it should be actually brought down to a feather edge having no appreciable thickness at 8d. The width of it, so long as it has an appreciable width indicated by W is not so important. It should however be from one-eighth to three-sixteenths of an inch wide, or wider for rough pipes, for best results.

It will be noted also that the feather-edge lip, 8c, has an internal surface arranged to be practically parallel to the axis of the pipe and it will also be noted by comparing the position of 8c in Fig. III with the position of the same structure in Fig. I where it is marked W that both the dependent or internal part of the cup-rubber and the feather-edge lip itself will have taken some initial stretch upon the insertion of the pipe 9 as shown in Fig. I.

In previous structures, heretofore generally referred to, the feather-edge lip is absent. Owing to the fact that it is impracticable, commercially, to lathe finish the ends of pipe for this class of work, they are always rough and as they are almost invariably dipped with some sort of asphaltic compound which does not harden smoothly the surface will always be more or less uneven and that part of the cup-rubber directly indicated by numeral 8 in Fig. III will not conform sufficiently close to the uneven surface to provide a tight joint until the pressure within the cup-rubber or in that space indicated by 8b has reached a very considerable figure.

Rubber, contrary to the general impression, is somewhat difficult to compress even though of the softer grades. When not closely confined it merely displaces upon the application of pressure upon a particular point and actual compression requires pressure in considerable amount. When pressure is applied evenly all over the entire surface, as it will be within the cup-rubber at 8b, no sensible compression of the rubber takes place without considerable internal pressure in the pipe. This is not true, however, of the feather-edge lip, 8c, being very thin it stretches easily and will closely conform to the rough surface of the pipe and even make a tight joint over the seam ridge commonly left when the pipe is made by autogenous welding. If this feather-edge lip were the total sealing device it would be insufficient, but as made it will take the pressure first at the extreme edge 8d when it is a very small fraction of a pound per square inch and the sealing effect is thought then to progress towards 8c as the pressure increases and it is known that when the pressure increases to large amounts, and they have been tested to 1600 lbs. per sq. in. on a four inch pipe, the pressure sealing effect is then effective through the heavier parts of the cup-rubber indicated generally by the numeral 8 in Fig. III.

The cup-rubber should be made of tough and highly resilient rubber compound in the manner well known to the art of making up rubber articles and the ingredients are not of importance so long as the resilient tough quality is attained and it may be rubber or anything else having the well known qualities of rubber.

Since all pipes are painted it will be well to swab a little fresh paint on the end of the pipe, 9, just before inserting in the joint as it will then enter the cup-rubber 8 very easily, the paint will have no detrimental action against the sealing qualities of the feather-edge lip.

Having thus disclosed my new invention so that anyone familiar with the art to which it appertains should be able to make and use it in the best form known to this inventor, what I claim as new and desire to secure by Letters Patent, is—

In a pipe joint, a sleeve member, an annular internal semi-circular section groove in said sleeve member, a cup-rubber adapted to bear in said groove and having approximate quadrants of said bearing of different radii, said cup-rubber including a dependent feather-edge lip to said cup, being thin and stretchable and adapted to conform closely to a rough surface of an inserted pipe prior to the application of internal fluid pressure.

RALPH H. PIERCE.